(12) United States Patent
Madden et al.

(10) Patent No.: US 6,184,299 B1
(45) Date of Patent: Feb. 6, 2001

(54) STAGED REACTOR PROCESS

(75) Inventors: James Daniel Madden, Charleston; Michael William Tilston, St. Albans, both of WV (US)

(73) Assignee: Union Carbide Chemicals & Plastics Technology Corporation, Danbury, CT (US)

( * ) Notice: Under 35 U.S.C. 154(b), the term of this patent shall be extended for 0 days.

(21) Appl. No.: 09/282,654

(22) Filed: Mar. 31, 1999

(51) Int. Cl.[7] ............... C08F 251/00; C08F 253/00; C08F 255/00
(52) U.S. Cl. .............. 525/242; 525/243; 525/245; 525/249
(58) Field of Search .................. 525/191, 240, 525/242, 243, 245, 249

(56) References Cited

U.S. PATENT DOCUMENTS 5,314,746 * 5/1994 Johnson et al. .................. 428/338
5,688,865 * 11/1997 Ali et al. ............................ 525/53

FOREIGN PATENT DOCUMENTS

| 041796 A2 | 12/1981 | (EP) . |
| 058523 A1 | 2/1993 | (EP) . |
| 794200 A2 | 9/1997 | (EP) . |

* cited by examiner

Primary Examiner—Nathan M. Nutter
(74) Attorney, Agent, or Firm—Saul R. Bresch

(57) ABSTRACT

A process comprising contacting ethylene and at least one alpha-olefin comonomer having with a transition metal based catalyst system in two fluidized bed reactors connected in series, in the gas phase, under polymerization conditions, with the proviso that a hydrocarbyl aluminum cocatalyst is introduced into the first reactor and a different hydrocarbyl aluminum cocatalyst or no cocatalyst is introduced into the second reactor.

9 Claims, No Drawings

STAGED REACTOR PROCESS

TECHNICAL FIELD

This invention relates to a process for preparing an in situ polyethylene blend in which process improved reactor operability and/or product enhancement is achieved.

BACKGROUND INFORMATION

There has been a rapid growth in the market for linear low density polyethylene (LLDPE), particularly resin made under mild operating conditions; typically at pressures of 100 to 400 psi and reaction temperatures of less than 120° C. This low pressure process provides a broad range of LLDPE products for blown and cast film, injection molding, rotational molding, blow molding, pipe, tubing, and wire and cable applications. LLDPE has essentially a linear backbone with only short chain branches, about 2 to 6 carbon atoms in length. In LLDPE, the length and frequency of branching, and, consequently, the density, is controlled by the type and amount of comonomer used in the polymerization. Although the majority of the LLDPE resins on the market today have a narrow molecular weight distribution, LLDPE resins with a broad molecular weight distribution are available for a number of non-film applications.

LLDPE resins designed for commodity type applications typically incorporate 1-butene as the comonomer. The use of a higher molecular weight alpha-olefin comonomer produces resins with significant strength advantages relative to those of ethylene/1-butene copolymers. The predominant higher alpha-olefin comonomers in commercial use are 1-hexene, 4-methyl-1-pentene, and 1-octene. The bulk of the LLDPE is used in film products where the excellent physical properties and drawdown characteristics of LLDPE film makes this film well suited for a broad spectrum of applications. Fabrication of LLDPE film is generally effected by the blown film and slot casting processes. The resulting film is characterized by excellent tensile strength, high ultimate elongation, good impact strength, and excellent puncture resistance.

These properties together with toughness are enhanced when the polyethylene is of high molecular weight. However, as the molecular weight of the polyethylene increases, the processability of the resin usually decreases. By providing a blend of polymers, the properties characteristic of high molecular weight resins can be retained and processability, particularly the extrudability (from the lower molecular weight component) can be improved.

The blending of these polymers is successfully achieved in a staged reactor process similar to those described in U.S. Pat. Nos. 5,047,468 and 5,149,738. Briefly, the process is one for the in situ blending of polymers wherein a higher density ethylene copolymer is prepared in a high melt index reactor and a lower density ethylene copolymer is prepared in a low melt index reactor. The process typically comprises continuously contacting, under polymerization conditions, a mixture of ethylene and one or more alpha-olefins with a catalyst system in two gas phase, fluidized bed reactors connected in series, said catalyst system comprising: (i) a supported magnesium/titanium based catalyst precursor; (ii) an aluminum containing activator compound; and (iii) a hydrocarbyl aluminum cocatalyst, the polymerization conditions being such that an ethylene copolymer having a melt index in the range of about 0.1 to about 1000 grams per 10 minutes is formed in the high melt index reactor and an ethylene copolymer having a melt index in the range of about 0.001 to about 1 gram per 10 minutes is formed in the low melt index reactor, each copolymer having a density of about 0.860 to about 0.965 gram per cubic centimeter and a melt flow ratio in the range of about 22 to about 70, with the provisos that:

(a) the mixture of ethylene copolymer matrix and active catalyst formed in the first reactor in the series is transferred to the second reactor in the series;

(b) other than the active catalyst referred to in proviso (a) and the cocatalyst referred to in proviso (e), no additional catalyst is introduced into the second reactor;

(c) in the high melt index reactor:
  (1) the alpha-olefin is present in a ratio of about 0.02 to about 3.5 moles of alpha-olefin per mole of ethylene; and
  (2) hydrogen is present in a ratio of about 0.05 to about 3 moles of hydrogen per mole of combined ethylene and alpha-olefin;

(d) in the low melt index reactor:
  (1) the alpha-olefin is present in a ratio of about 0.02 to about 3.5 moles of alpha-olefin per mole of ethylene; and
  (2) hydrogen is, optionally, present in a ratio of about 0.0001 to about 0.5 mole of hydrogen per mole of combined ethylene and alpha-olefin; and (e) additional hydrocarbyl aluminum cocatalyst is introduced into the second reactor in an amount sufficient to restore the level of activity of the catalyst transferred from the first reactor to about the initial level of activity in the first reactor.

While the in situ blends prepared as above and the films produced therefrom are found to have the advantageous characteristics heretofore mentioned, it is found that reactor operability is affected by the choice of the cocatalyst, particularly trimethylaluminum.

DISCLOSURE OF THE INVENTION

An object of this invention, therefore, is to provide a process for preparing an in situ blend in which catalyst productivity is substantially increased over prior art in situ processes. Other objects and advantages will become apparent hereinafter.

According to the present invention such a process has been discovered. The process comprises contacting ethylene and at least one alpha-olefin comonomer having 3 to 8 carbon atoms with a transition metal based catalyst system in two fluidized bed reactors connected in series, in the gas phase, under polymerization conditions, with the provisos that:

(a) ethylene is introduced into each reactor;

(b) the mixture of ethylene copolymer matrix and active catalyst formed in the first reactor in the series is transferred to the second reactor in the series;

(c) other than the active catalyst referred to in proviso (b), no additional catalyst is introduced into the second reactor;

(d) a hydrocarbyl aluminum cocatalyst is introduced into the first reactor and a different hydrocarbyl aluminum cocatalyst or no cocatalyst is introduced into the second reactor;

(e) in the reactor in which a low melt or flow index copolymer is made:
  (1) the alpha-olefin is present in a ratio of about 0.01 to about 0.8 mol of alpha-olefin per mol of ethylene; and
  (2) optionally, hydrogen is present in a ratio of about 0.001 to about 0.3 mol of hydrogen per mol of ethylene; and (f) in the reactor in which a high melt or flow index polymer is made:
  (1) optionally, alpha-olefin is present in a ratio of about 0.005 to about 0.6 mol of alpha-olefin per mol of ethylene; and
  (2) optionally. hydrogen is present in a ratio of about 0.2 to about 3 mols of hydrogen per mol of ethylene.

DESCRIPTION OF THE PREFERRED EMBODIMENT(S)

As noted, the blend is produced in two staged reactors connected in series wherein a mixture of resin and active catalyst is transferred from the first reactor to the second reactor in which another polymer is prepared and blends in situ with the copolymer from the first reactor.

The gaseous materials used in the process can be introduced into the reactors via a recycle gas. The recycle gas is defined as a mixture of gases including ethylene and one or more alpha-olefins having 3 to 8 carbon atoms, preferably one or two alpha-olefins, as comonomers (alpha-olefin is required in the first reactor recycle gas and is optional in the second reactor recycle gas), and, optionally, one or more inert gases such as nitrogen (to make up the desired reactor pressure), inert hydrocarbons, and hydrogen. The alpha-olefins can be, for example, propylene, 1-butene, 1-hexene, 4-methyl-1-pentene, and 1-octene. The recycle gas can also be referred to as the inlet gas or cycle gas.

Preferred comonomer combinations are:

| first reactor | second reactor |
| --- | --- |
| 1-hexene | 1-hexene |
| 1-butene | 1-hexene |
| 1-butene | 1-butene |
| 1-hexene | 1-butene |

The 1-hexene/1-hexene combination is found to give the best film properties. It is noted that an ethylene homopolymer can be made in the second reactor, if desired.

It will be understood that generally the in situ blend can be characterized as a bimodal resin. In some cases, however, the two components making up the blend are sufficiently close in average molecular weight that there is no discernible discontinuity in the molecular weight curve.

The properties of bimodal resins are strongly dependent on the proportion of the high molecular weight component, i.e., the low melt or flow index component. For a staged reactor system, the proportion of the high molecular weight component is controlled via the relative production rate in each reactor. The relative production rate in each reactor can, in turn, be controlled by a computer application program, which monitors the production rate in the reactors (measured by heat balance) and then manipulates the ethylene partial pressure in each reactor and catalyst feed rate in order to meet the production rate, the production rate split, and catalyst productivity requirements.

Transition metal catalyst systems can be exemplified by the magnesium/titanium catalyst system described in U.S. Pat. No. 4,302,565. In addition to the gas phase, the resins referred to in this specification can also be produced in a slurry or solution phase. The precursor can be supported or unsupported. Another catalyst system is one where the precursor is formed by spray drying and used in slurry form. Such a catalyst precursor, for example, contains titanium, magnesium, and an electron donor, and, optionally, an aluminum halide. The precursor is then introduced into a hydrocarbon medium such as mineral oil to provide the slurry form. This is described in U.S. Pat. No. 5,290,745. Further, the catalyst system can be a vanadium based catalyst system such as that described in U.S. Pat. No. 4,508,842; a chromium based catalyst system such as that described in U.S. Pat. No. 4,101,445; or other transition metal catalyst systems useful in the preparation of polyolefins such as polyethylene and polypropylene. Many of these catalyst systems are often referred to as Ziegler-Natta catalyst systems. Catalyst systems, which use chromium or molybdenum oxides on silica-alumina supports, are also useful. The preferred catalyst system is a magnesium/titanium based catalyst system.

With respect to typical magnesium/titanium based catalyst systems:

The electron donor, if used in the catalyst precursor, is an organic Lewis base, liquid at temperatures in the range of about 0° C. to about 200° C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of titanium compound and electron donor, the reaction product finally contains about 1 to about 20 moles of electron donor per mole of titanium compound and preferably about 1 to about 10 moles of electron donor per mole of titanium compound.

An activator compound is optional, but is often used with any of the titanium based catalyst precursors. The activator can have the formula $AlR_aX_bH_c$ wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminium mono- and dichlorides wherein each alkyl radical has 1 to 6 carbon atoms and the trialkylaluminums. A particularly preferred activator is a mixture of diethylaluminum chloride and tri-n-hexylaluminum. If it is desired to use an activator, about 0.10 to about 10 moles, and preferably about 0.15 to about 2.5 moles, of activator can be used per mole of electron donor. The molar ratio of activator to titanium can be in the range of about 1:1 to about 10:1 and is preferably in the range of about 2:1 to about 5:1.

The cocatalyst, generally a hydrocarbyl aluminum cocatalyst, can be represented by the formula $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum hydride, di-isobutyl-hexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, diisobutylaluminum chloride, and ethylaluminum sesquichloride. The cocatalyst compounds can also serve as activators and modifiers.

It is unexpectedly found that by using different cocatalysts in each reactor, the benefits provided by both cocatalysts can be obtained. For example, trimethylaluminum (TMA) is shown to improve film strength characteristics and reduce hexane extractables, but is accompanied by continuity problems, while triethylaluminum (TEAL) solves the continuity problems, i.e., reactor breakdown. Surprisingly, the omission of a cocatalyst in the second reactor also reduces continuity problems. It is preferred that TMA be used in the first reactor and TEAL be used in the second reactor.

Preferred cocatalyst combinations are as follows:

| first reactor | second reactor |
|---|---|
| trimethylaluminum (TMA) | triethylaluminum (TEAL) |
| trimethylaluminum (TMA) | none |
| diethylaluminum chloride (DEAC) | tri-n-hexylaluminum (TnHAL) |
| diisobutylaluminum chloride (DIBAC) | triisobutylaluminum (TIBA) |

It is preferred not to use a support. However, in those cases where it is desired to support the precursor, silica is the preferred support. Other suitable supports are inorganic oxides such as aluminum phosphate, alumina, silica/alumina mixtures, silica modified with an organoaluminum compound such as triethylaluminum, and silica modified with diethyl zinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators. For variations, see, for example, U.S. Pat. No. 5,106,926. The cocatalyst is preferably added separately neat or as a solution in an inert solvent, such as isopentane, to the polymerization reactor at the same time as the flow of ethylene is initiated.

U.S. Pat. No. 5,106,926 provides another example of a magnesium/titanium based catalyst system comprising:
(a) a catalyst precursor having the formula $Mg_dTi(OR)_eX_f(ED)_g$ wherein R is an aliphatic or aromatic hydrocarbon radical having 1 to 14 carbon atom or OCR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is 1.5d+2;
(b) at least one modifier having the formula $BX_3$ or $AlR_{(3-e)}X_e$ wherein each R is alkyl or aryl and is the same or different, and X and e are as defined above for component (a)
wherein components (a) and (b) are impregnated into an inorganic support; and
(c) a hydrocarbyl aluminum cocatalyst.

The precursor is prepared from a titanium compound, a magnesium compound, and an electron donor. Titanium compounds, which are useful in preparing these precursors, have the formula $Ti(OR)_eX_h$ wherein R, X, and e are as defined above for component (a); h is an integer from 1 to 4; and e+h is 3 or 4. Examples of titanium compounds are $TiCl_3$, $TiCl_4$, $Ti(OC_2H_5)_2Br_2$, $Ti(OC_6H_5)Cl_3$, $Ti(OCOCH_3)Cl_3$, and $Ti(OCOC_6H_5)Cl_3$. The magnesium compounds include magnesium halides such as $MgCl_2$, $MgBr_2$, and $MgI_2$. Anhydrous $MgCl_2$ is a preferred compound. About 0.5 to 56, and preferably about 1 to 10, moles of the magnesium compound are used per mole of titanium compound.

The electron donor, the support, and the cocatalyst are the same as those described above. As noted, the modifier can be similar in chemical structure to the aluminum containing activators. The modifier has the formula $BX_3$ or $AlR_{(3-e)}X_e$ wherein each R is independently alkyl having 1 to 14 carbon atoms; each X is independently chlorine, bromine, or iodine; and e is 1 or 2. One or more modifiers can be used. Preferred modifiers include alkylaluminum mono- and dichlorides wherein each alkyl radical has 1 to 6 carbon atoms; boron trichloride; and the trialkylaluminums. About 0.1 to about 10 moles, and preferably about 0.2 to about 2.5 moles, of modifier can be used per mole of electron donor. The molar ratio of modifier to titanium can be in the range of about 1:1 to about 10:1 and is preferably in the range of about 2:1 to about 5:1.

With regard to transition metal catalyst systems in general:

The entire catalyst system, which includes the precursor or activated precursor and the cocatalyst, is added to the first reactor. The catalyst is admixed with the copolymer produced in the first reactor, and the mixture is transferred to the second reactor. Insofar as the catalyst system is concerned, only cocatalyst, if desired, is added to the second reactor from an outside source.

The polymerization in each reactor is, preferably, conducted in the gas phase using a continuous fluidized process. A typical fluidized bed reactor is described in U.S. Pat. No. 4,482,687.

A relatively low melt or flow index (or high molecular weight) copolymer is usually prepared in the first reactor. The mixture of polymer and an active catalyst is usually transferred from the first reactor to the second reactor via an interconnecting device using nitrogen or second reactor recycle gas as a transfer medium. Alternatively, the low molecular weight copolymer can be prepared in the first reactor and the high molecular weight copolymer can be prepared in the second reactor.

In the high molecular weight reactor:

Because of the low values, instead of melt index, flow index is determined and those values are used in this specification. The flow index can be in the range of about 0.01 to about 50 grams per 10 minutes, and is preferably in the range of about 0.2 to about 12 grams per 10 minutes. The molecular weight of this polymer is, generally, in the range of about 135,000 to about 445,000. The density of the copolymer can be at least 0.860 gram per cubic centimeter, and is preferably in the range of 0.890 to 0.940 gram per cubic centimeter. The melt flow ratio of the polymer can be in the range of about 12 to about 70, and is preferably about 14 to about 45.

Melt index is determined under ASTM D-1238, Condition E. It is measured at 190° C. and 2.16 kilograms and reported as grams per 10 minutes or decigrams per minute. Flow index is determined under ASTM D-1238, Condition F. It is measured at 190° C. and 10 times the weight used in determining the melt index, and reported as grams per 10 minutes or decigrams per minute. Melt flow ratio is the ratio of flow index to melt index.

In the low molecular weight reactor:

A relatively high melt or flow index (or low molecular weight) copolymer is prepared in this reactor. The high melt index can be in the range of about 0.5 to about 3000 grams per 10 minutes, and is preferably in the range of about 1 to about 1000 grams per 10 minutes. The molecular weight of the high melt index copolymer is, generally, in the range of about 15,800 to about 35,000. The density of the copolymer prepared in this reactor can be at least 0.900 gram per cubic centimeter, and is preferably in the range of 0.910 to 0.975 gram per cubic centimeter. The melt flow ratio of this copolymer can be in the range of about 12 to about 70, and is preferably about 14 to about 45.

The blend or final product, as removed from the second reactor, can have a melt index in the range of about 0.02 to about 3.5 grams per 10 minutes, and preferably has a melt index in the range of about 0.04 to about 2.0 grams per 10 minutes. The melt flow ratio is in the range of about 30 to about 150, and is preferably in the range of about 35 to about 145. The molecular weight of the final product is, generally, in the range of about 90,000 to about 450,000. The density of the blend can be at least 0.910 gram per cubic centimeter, and is preferably in the range of 0.916 to 0.960 gram per cubic centimeter.

The blend has a broad molecular weight distribution which can be characterized as bimodal. The broad molecular weight distribution is reflected in an Mw/Mn ratio of about 4 to about 40, preferably about 6 to about 30. Mw is the weight average molecular weight; Mn is the number average molecular weight; and the Mw/Mn ratio can be referred to as the polydispersity index, which is a measure of the breadth of the molecular weight distribution.

The weight ratio of copolymer prepared in the high molecular weight reactor to copolymer prepared in the low molecular weight reactor can be in the range of about 30:70 to about 80:20, and is preferably in the range of about 40:60 to about 60:40. This is also known as the split.

The transition metal based catalyst system including the cocatalyst, ethylene, alpha-olefin, and, optionally, hydrogen are continuously fed into the first reactor; the polymer/active catalyst mixture is continuously transferred from the first reactor to the second reactor; ethylene and, optionally, alpha-olefin and hydrogen, and cocatalyst (if used) are continuously fed to the second reactor. The final product is continuously removed from the second reactor.

In the low melt index, as reflected in flow index reactor, preferably the first reactor:

The mole ratio of alpha-olefin to ethylene can be in the range of about 0.01:1 to about 0.8:1, and is preferably in the range of about 0.02:1 to about 0.35:1. The mole ratio of hydrogen (if used) to ethylene can be in the range of about 0.001:1 to about 0.3:1, and is preferably in the range of about 0.017:1 to about 0.18:1. Preferred operating temperatures vary depending on the density desired, i.e., lower temperatures for lower densities and higher temperatures for higher densities.

In the high melt or flow index reactor, preferably the second reactor:

The mole ratio of alpha-olefin (optional) to ethylene can be in the range of about 0.005:1 to about 0.6:1, and is preferably in the range of about 0.01:1 to about 0.42:1. The mole ratio of hydrogen (optional) to ethylene can be in the range of about 0.01:1 to about 3:1, and is preferably in the range of about 0.5:1 to about 2.2:1. The operating temperature is generally in the range of about 70° C. to about 110° C. As mentioned above, the temperature is preferably varied with the desired density.

The pressure is generally the same in both the first and second reactors. The pressure, i.e., the total pressure in the reactor can be in the range of about 200 to about 450 psi and is preferably in the range of about 280 to about 400 psig. The ethylene partial pressure in the first reactor can be in the range of about 10 to about 100 psig, and is preferably in the range of about 20 to about 50 psig. The ethylene partial pressure in the second reactor is set according to the amount of copolymer it is desired to produce in this reactor to achieve the split mentioned above. It is noted that increasing the ethylene partial pressure in the first reactor leads to an increase in ethylene partial pressure in the second reactor. The balance of the total pressure is provided by alpha-olefin other than ethylene and an inert gas such as nitrogen.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

A typical fluidized bed reactor is described in U.S. Pat. No. 4,482,687.

The gaseous feed streams of ethylene, other gaseous alpha-olefins, and hydrogen, when used, are preferably fed to the reactor recycle line as well as liquid alpha-olefins and the cocatalyst solution. Optionally, the liquid cocatalyst can be fed directly to the fluidized bed. The partially activated or completely activated catalyst precursor is preferably injected into the fluidized bed as a solid or a mineral oil slurry. In the case of partial activation, activator is added to the reactor. The product composition can be varied by changing the molar ratios of the comonomers introduced into the fluidized bed. The product is continuously discharged in granular or particulate form from the reactor as the bed level builds up with polymerization. The production rate is controlled by adjusting the catalyst feed rate and/or the ethylene partial pressures in both reactors.

The hydrogen:ethylene molar ratio can be adjusted to control average molecular weights. The alpha-olefins (other than ethylene) can be present in a total amount of up to 15 percent by weight of the copolymer and, if used, are preferably included in the copolymer in a total amount of about 1 to about 10 percent by weight based on the weight of the copolymer.

The residence time of the mixture of reactants including gaseous and liquid reactants, catalyst, and resin in each fluidized bed can be in the range of about 1 to about 12 hours and is preferably in the range of about 2 to about 5 hours.

The reactors can be run in the condensing mode, if desired. The condensing mode is described in U.S. Pat. Nos. 4,543,399 and 4,588,790.

The resin blend can be extruded into film in a conventional extruder adapted for that purpose. Extruders and processes for extrusion are described in U.S. Pat. Nos. 4,814,135; 4,857,600; 5,076,988; and 5,153,382. Examples of various extruders, which can be used in forming the film are a single screw type such as one modified with a blown film die and air ring and continuous take off equipment, a blown film extruder, and a slot cast extruder. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 160 to about 270 degrees C., and is preferably carried out at temperatures in the range of about 180 to about 240 degrees C.

The advantage of the invention is found in obtaining the benefits of different cocatalysts, and particularly in resolving continuity problems such as agglomeration and sheeting caused by static electricity. Continuity problems are defined as any problem requiring the catalyst feed to be terminated and some portion of the reaction system to be opened for agglomerate removal. Another advantage is the capability of achieving low melt flow ratios (MFRs).

Conventional additives, which can be introduced into the blend, are exemplified by antioxidants, ultraviolet absorbers, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of about 0.1 to about 10 parts by weight of additive for each 100 parts by weight of polymer blend. Fillers can be added in amounts up to 200 parts by weight and more for each 100 parts by weight of the blend.

Molecular weights are weight average molecular weights unless otherwise noted.

Patents and patent applications mentioned in this specification are incorporated by reference herein.

The invention is illustrated by the following examples.

Examples 1 and 2

A titanium trichloride catalyst precursor is prepared in a 1900 liter vessel equipped with pressure and temperature controls and a turbine agitator. A nitrogen atmosphere (less than 5 ppm $H_2O$) is maintained at all times.

1480 liters of anhydrous tetrahydrofuran (THF) containing less than 40 ppm $H_2O$ are added to the vessel. The THF is heated to a temperature of 50 degrees C., and 1.7 kilograms of granular magnesium metal (70.9 gram atoms) are added, followed by 27.2 kilograms of titanium tetrachloride (137 mols). The magnesium metal has a particle size in the range of from 0.1 to 4 millimeters. The titanium tetrachloride is added over a period of about one-half hour.

The mixture is continuously agitated. The exotherm resulting from the addition of titanium tetrachloride causes the temperature of the mixture to rise to approximately 72 degrees C. over a period of about three hours. The temperature is held at about 70 degrees C. by heating for approximately another four hours. At the end of this time, 61.7 kilograms of magnesium dichloride (540 mols) are added and heating is continued at 70 degrees C. for another eight hours. The mixture (solution) is then filtered through a 100 micron filter to remove undissolved magnesium dichloride and unreacted magnesium (less than 0.5 percent by weight).

100 kilograms of fumed silica having a particle size in the range of from 0.1 to 1 microns are added to the mixture prepared above over a period of about two hours. The mixture is stirred by means of a turbine agitator during this time and for several hours thereafter to thoroughly disperse the silica in the solution. The temperature of the mixture is held at 70 degrees C. throughout this period and a nitrogen atmosphere is maintained at all times.

The resulting slurry is spray dried using an 8-foot diameter closed cycle spray dryer equipped with a rotary atomizer. The rotary atomizer is adjusted to give catalyst particles with a D50 of 12 microns. The scrubber section of the spray dryer is maintained at approximately minus 4 degrees C.

Nitrogen gas is introduced into the spray dryer at an inlet temperature of 140 degrees C. and is circulated at a rate of approximately 1700 kilograms per hour. The catalyst slurry is fed to the spray dryer at a temperature of about 35 degrees C. and a rate of 90 to 95 kilograms per hour, or sufficient to yield an outlet gas temperature of approximately 100 degrees C. The atomization pressure is slightly above atmospheric. Discrete spray dried catalyst precursor particles are formed.

The spray dried catalyst precursor contains 2.5 weight percent Ti, 6.3 weight percent Mg, and 29.2 weight percent THF. The particles have a D10 of 8 microns, a D50 of 12 microns, and a D90 of 18.6 microns as determined by means of a Leeds and Northrup Microtrac$^a$ particle size analyzer using a dodecane solvent.

The discrete catalyst precursor particles are mixed with mineral oil under a nitrogen atmosphere in a 400 liter vessel equipped with a turbine agitator to form a slurry containing approximately 28 weight percent of the solid catalyst precursor. A 50 weight percent solution of tri-n-hexylaluminum in mineral oil is added and the slurry is stirred for one hour. The tri-n-hexylaluminum solution is employed in an amount sufficient to provide 0.2 mol of tri-n-hexylaluminum per mol of THF in the catalyst. A 30 weight percent solution of diethylaluminum chloride (DEAC) in mineral oil is then added and the mixture is stirred for another hour. The DEAC is employed in an amount sufficient to provide 0.45 mol of DEAC per mol of THF in the catalyst.

Ethylene is copolymerized with 1-hexene in each of two fluidized bed reactors. Each polymerization is continuously conducted after equilibrium is reached under conditions set forth in the Table. Polymerization is initiated in the first reactor by continuously feeding the above catalyst precursor and cocatalyst TMA into a fluidized bed of polyethylene granules together with ethylene, 1-hexene, and hydrogen. The cocatalyst is first dissolved in isopentane. The resulting copolymer mixed with active catalyst is withdrawn from the first reactor and transferred to the second reactor using nitrogen as a transfer medium. The second reactor also contains a fluidized bed of polyethylene granules. Again, ethylene, 1-hexene, and hydrogen are introduced into the second reactor where the gases come into contact with the copolymer and catalyst from the first reactor. In this reactor, the cocatalyst TEAL (first dissolved in isopentane) is introduced. The product blend is continuously removed.

Example 2 is a comparative example run in the same manner as Example 1. The significant difference in example 2 is that the cocatalyst TMA is used in both reactors.

During 11 weeks of operation with TMA feed to both reactors (comparative example 2), the process is shut down for an extended period on 21 different occasions due to sheeting and chunking problems. Over the next 11 weeks, while feeding a different cocatalyst (TEAL) to the second reactor (example 1, an embodiment of the invention) and running at a lower melt flow ratio, the process is shut down for chunking on only 3 occasions. Despite the fact that TEAL usually produces resin with poorer film properties, product analysis of samples finds no deficiencies when compared to the resin that is produced with TMA in both reactors.

TABLE

|  | example 1 | | example 2 | |
| --- | --- | --- | --- | --- |
|  | reactor one | reactor two | reactor one | reactor two |
| reaction conditions | | | | |
| pressure (psig) | 297 | 360 | 307 | 315 |
| temperature (degrees C.) | 70 | 80 | 70 | 80 |
| C2 partial pressure (psia) | 40 | 90 | 38 | 76 |
| H2/C2 molar ratio | 0.075 | 0.3 | 0.075 | 1.5 |
| C6/C2 molar ratio | 0.17 | 0.018 | 0.135 | 0.07 |
| recycle isopentane (mol %) | 6.9 | 9.5 | 6.8 | 17.7 |
| cocatalyst solution | 2% TMA | 5% TEAL | 2% TMA | 1% TMA |
| cocatalyst feed rate (cc/hr) | 90 | 70 | 150 | 130 |
| titanium split (%) | 51 | 49 | 0.49 | 0.51 |
| SGV (feet per second) | 1.6 | 1.65 | 1.6 | 1.6 |
| bed weight (pounds) | 80 | 120 | 79 | 123 |
| residence time (hours) | 3.2 | 5 | 3.2 | 4.7 |

TABLE-continued

|  | example 1 | | example 2 | |
| --- | --- | --- | --- | --- |
|  | reactor one | reactor two | reactor one | reactor two |
| production rate (pounds per hour) | 25 | 24 | 25 | 26 |
| resin properties | | | | |
| flow index (dg/min) | 3.35 | 8.05 | 1.52 | 24.9 |
| melt index (dg/min) | — | 0.256 | — | 0.52 |
| density (g/cc) | 0.9064 | 0.9264 | 0.9123 | 0.9285 |
| melt flow ratio | — | 31.4 | — | 36.6 |
| residual aluminum (ppm) | 43 | 40 | 86 | 52 |
| residual titanium (ppm) | 3.02 | 1.53 | 7.7 | 3.7 |
| Al/Ti atomic ratio | 25 | 46 | 19 | 26 |
| tensile strength (psi) MD | — | 8580 | — | 8768 |
| tensile strength (psi) TD | — | 5755 | — | 6830 |
| Elmendorf tear (g/mil) MD | — | 127 | — | 550 |
| Elmendorf tear (g/mil) TD | — | 1257 | — | 988 |
| dart drop g/mil | — | 107 | — | 149 |

Notes to above Table:
1. Resin properties for second reactor: these are properties of the final product.
2. Titanium split = the percent of the total product produced in the first and second reactors based on titanium catalyst residue.
3. SGV = superficial gas velocity reported in feet per second.
4. Production rate = pounds of resin per hour.
5. Density is measured by producing a plaque in accordance with ASTM D-1928, procedure C, and then testing as is via ASTM D-1505. The density is reported in gram per cubic centimeter.
6. Residual aluminum = parts by weight of aluminum per million parts by weight of resin.
7. Residual titanium = parts by weight of titanium per million parts by weight of resin.
8. Tensile strength is measured in the machine direction and the transverse direction in pounds per square inch under ASTM D-882.
9. Elmendorf tear is measured in the machine direction and the transverse direction in grams per mil under ASTM D-1992-89.
10. Dart drop is measured in grams per mil under ASTM D-1709-97.

What is claimed is:

1. A process comprising contacting ethylene and at least one alpha-olefin comonomer having 3 to 8 carbon atoms with a transition metal based catalyst system in two fluidized bed reactors connected in series, in the gas phase, under polymerization conditions, with the provisos that:
   (a) ethylene is introduced into each reactor;
   (b) the mixture of ethylene copolymer matrix and active catalyst formed in the first reactor in the series is transferred to the second reactor in the series;
   (c) other than the active catalyst referred to in proviso (b), no additional catalyst is introduced into the second reactor;
   (d) a hydrocarbyl aluminum cocatalyst is introduced into the first reactor and a different hydrocarbyl aluminum cocatalyst or no cocatalyst is introduced into the second reactor;

(e) in the reactor in which a low melt or flow index copolymer is made:
  (1) the alpha-olefin is present in a ratio of about 0.01 to about 0.8 mol of alpha-olefin per mol of ethylene; and
  (2) optionally, hydrogen is present in a ratio of about 0.001 to about 0.3 mol of hydrogen per mol of ethylene; and
(f) in the reactor in which a high melt or flow index polymer is made:
  (1) optionally, alpha-olefin is present in a ratio of about 0.005 to about 0.6 mol of alpha-olefin per mol of ethylene; and
  (2) optionally, hydrogen is present in a ratio of about 0.2 to about 3 mols of hydrogen per mol of ethylene.

2. The process defined in claim 1 wherein the transition metal catalyst system is a magnesium/titanium based catalyst system.

3. The process defined in claim 1 wherein the different hydrocarbyl aluminum cocatalysts have the formulae $R_3Al$ or $R_2AlX$ wherein each R is independently alkyl, cycloalkyl, aryl, or hydrogen; at least one R is hydrocarbyl; each hydrocarbyl has 1 to 20 carbon atoms; two or three R radicals can be joined to form a heterocyclic structure; and X is a halogen atom.

4. The process defined in claim 1 wherein the different hydrocarbyl aluminum cocatalysts are selected from the group consisting of triisobutylaluminum, tri-n-hexylaluminum, di-isobutyl-aluminum hydride, dihexylaluminum hydride, di-isobutyl-hexylaluminum, isobutyl dihexylaluminum, trimethylaluminum, triethylaluminum, tripropylaluminumi, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, diisobutylaluminum chloride, and ethylaluminum sesquichloride.

5. The process defined in claim 1 wherein the copolymer formed in one reactor has a flow index in the range of about 0.01 to about 50 grams per 10 minutes and a density in the range of about 0.860 to about 0.940 gram per cubic centimeter and the polymer formed in the other reactor has a melt index in the range of about 5 to about 3000 grams per 10 minutes and a density in the range of about 0.900 to about 0.975 gram per cubic centimeter, the weight ratio of the high molecular weight copolymer to the low molecular weight polymer being in the range of about 30:70 to about 80:20.

6. The process defined in claim 5 wherein the blend has a melt index in the range of about 0.02 to about 3.5 grams per 10 minutes; a melt flow ratio in the range of about 30 to about 150; and a density in the range of 0.910 to 0.960 gram per cubic centimeter.

7. The process defined in claim 5 wherein the blend is produced under the following conditions:

in the reactor referred to in item(e):
  (1) the alpha-olefin is 1-hexene and is present in a ratio of about 0.02 to about 0.35 mol of alpha-olefin per mol of ethylene; and
  (2) hydrogen is present in a ratio of about 0.017 to about 0.18 mol of hydrogen per mol of ethylene; and in the reactor referred to in item (f):
  (1) the alpha-olefin is 1-hexene or 1-butene and is present in a ratio of about 0.01 to about 0.42 mol of alpha-olefin per mol of ethylene; and
  (2) hydrogen is present in a ratio of about 1.7 to about 2.2 mols of hydrogen per mol of ethylene.

8. The process defined in claim 6 wherein the blend has a melt index in the range of about 0.04 to about 2.0 grams per 10 minutes; a melt flow ratio in the range of about 35 to about 145; and a density in the range of 0.916 to 0.960 gram per cubic centimeter.

9. A gas phase process for the production of a polyethylene blend wherein the polymer formed in the first reactor is a copolymer of ethylene, 1-hexene, and, optionally, one or more other up to 8 carbon atom alpha-olefins having a flow index in the range of about 0.2 to about 12 grams per 10 minutes and a density in the range of about 0.890 to about 0.940 gram per cubic centimeter and the polymer formed in the second reactor is a copolymer of ethylene, 1-butene or 1-hexene, and, optionally, one or more other up to 8 carbon atom alpha-olefins having a melt index in the range of about 7 to about 1000 grams per 10 minutes and a density in the range of about 0.910 to about 0.975 gram per cubic centimeter, the weight ratio of first reactor polymer to second reactor polymer being in the range of about 40:60 to about 60:40, comprising contacting ethylene and the aforementioned alpha-olefins with a magnesium/titanium based catalyst system in two fluidized bed reactors connected in series, under polymerization conditions, with the provisos that:

(a) ethylene is introduced into each reactor;

(b) the mixture of ethylene copolymer matrix and active catalyst formed in the first reactor in the series is transferred to the second reactor in the series;

(c) other than the active catalyst referred to in proviso (b), no additional catalyst is introduced into the second reactor;

(d) a cocatalyst, trimethylaluminum, is introduced into the first reactor and a cocatalyst, triethylaluminum, is introduced into the second reactor;

(e) in the first reactor:
  (1) the alpha-olefin is present in a ratio of about 0.02 to about 0.8 mol of alpha-olefin per mol of ethylene;
  (2) hydrogen is present in a ratio of about 0.017 to about 0.18 mol of hydrogen per mol of ethylene; and (f) in the second reactor:
  (1) the alpha-olefin is present in a ratio of about 0.01 to about 0.8 mol of alpha-olefin per mol of ethylene; and
  (2) hydrogen is present in a ratio of about 0.5 to about 2.2 moles of hydrogen per mole of ethylene.

* * * * *